US007899008B2

(12) United States Patent
Holtzman et al.

(10) Patent No.: US 7,899,008 B2
(45) Date of Patent: *Mar. 1, 2011

(54) METHOD AND APPARATUS FOR SCHEDULING PACKET DATA TRANSMISSION IN A WIRELESS COMMUNICATION SYSTEM

(75) Inventors: Jack M. Holtzman, San Diego, CA (US); Leonid Razoumov, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 1157 days.

This patent is subject to a terminal disclaimer.

(21) Appl. No.: 10/670,910

(22) Filed: Sep. 24, 2003

(65) Prior Publication Data

US 2004/0062219 A1    Apr. 1, 2004

Related U.S. Application Data

(63) Continuation of application No. 09/834,774, filed on Apr. 12, 2001, now Pat. No. 6,657,980.

(51) Int. Cl.
*H04Q 7/00* (2006.01)
*H04B 7/208* (2006.01)
(52) U.S. Cl. ...................................... 370/329; 370/444
(58) Field of Classification Search ........................ None
See application file for complete search history.

(56) References Cited

U.S. PATENT DOCUMENTS

| 4,763,322 | A | 8/1988 | Eizenhofer |
| 5,101,501 | A | 3/1992 | Gilhousen et al. |
| 5,226,045 | A | 7/1993 | Chuang |
| 5,287,347 | A | 2/1994 | Spanke |

(Continued)

FOREIGN PATENT DOCUMENTS

DE    19751110    5/1999

(Continued)

OTHER PUBLICATIONS

A. Jalali, et al., "Data Throughput of CDMA-HDR a High Efficiency-High Data Rate Personal Communication Wireless System," IEEE, VTC2000, QUALCOMM Inc., San Diego, California (USA). 2000, (pp. 1854-1858).

(Continued)

*Primary Examiner*—Ayaz R Sheikh
*Assistant Examiner*—Blanche Wong
(74) *Attorney, Agent, or Firm*—Charles Eggers

(57) ABSTRACT

A method (18) for scheduling packet data transmissions in a wireless communication system wherein a per-user Priority Function (PF) (24) is based on a channel condition indicated by a Rate Request Indicator (RRI). The method also considers fairness criteria dictated by predetermined Quality of Service (QOS) requirements. In one embodiment, the rate request indicator is a Data Rate Request (DRR). In another embodiment, the rate request indicator is Carrier-to-Interference (C/I) information. In the exemplary embodiment, the base station calculates a Priority Function (PF) for the multiple mobile users. Each PF is a function of the rate request indicator and the projected throughput of a given mobile user. In one embodiment, the predicted throughput is calculated by $T'=(T')^\alpha$.

21 Claims, 4 Drawing Sheets

U.S. PATENT DOCUMENTS

| | | | |
|---|---|---|---|
| 5,442,625 A | 8/1995 | Gitlin et al. |
| 5,499,238 A | 3/1996 | Shon |
| 5,583,869 A | 12/1996 | Grube et al. |
| 5,619,492 A | 4/1997 | Press et al. |
| 5,648,955 A | 7/1997 | Jensen et al. |
| 5,671,218 A | 9/1997 | I et al. |
| 5,729,534 A | 3/1998 | Jokinen et al. |
| 5,734,646 A | 3/1998 | I et al. |
| 5,745,480 A | 4/1998 | Behtash et al. |
| 5,856,971 A | 1/1999 | Gitlin et al. |
| 5,859,835 A | 1/1999 | Varma et al. |
| 5,903,554 A | 5/1999 | Saints |
| 5,914,950 A | 6/1999 | Tiedemann, Jr. et al. |
| 5,923,656 A | 7/1999 | Duan et al. |
| 5,970,062 A | 10/1999 | Bauchet |
| 5,978,657 A | 11/1999 | Suzuki |
| 5,996,019 A | 11/1999 | Hauser et al. |
| 6,052,408 A | 4/2000 | Trompower et al. |
| 6,075,792 A | 6/2000 | Ozluturk |
| 6,088,335 A | 7/2000 | I et al. |
| 6,091,717 A | 7/2000 | Honkasalo et al. |
| 6,128,322 A | 10/2000 | Rasanen et al. |
| 6,252,854 B1 | 6/2001 | Hortensius et al. |
| 6,400,699 B1 | 6/2002 | Airy et al. |
| 6,411,617 B1 | 6/2002 | Kilkki et al. |
| 6,421,335 B1 | 7/2002 | Kilkki et al. |
| 6,445,707 B1 | 9/2002 | Iuoras et al. |
| 6,466,797 B1 | 10/2002 | Frodigh et al. |
| 6,542,736 B1 | 4/2003 | Parkvall et al. |
| 6,574,211 B2 | 6/2003 | Padovani et al. |
| 6,590,890 B1 | 7/2003 | Stolyar et al. |
| 6,597,913 B2 | 7/2003 | Natarajan |
| 6,788,687 B2 | 9/2004 | Bao et al. |
| 6,807,426 B2 | 10/2004 | Pankaj |
| 6,847,629 B2 | 1/2005 | Razoumov et al. |
| 6,885,868 B1 | 4/2005 | Naim et al. |
| 7,027,392 B2 | 4/2006 | Holtzman et al. |
| 7,110,786 B2 | 9/2006 | Moulsley et al. |
| 7,158,796 B2 | 1/2007 | Tiedemann, Jr. et al. |
| 7,197,319 B2 | 3/2007 | Tiedemann, Jr. et al. |
| 7,245,595 B2 | 7/2007 | Kim et al. |
| 7,283,482 B2 | 10/2007 | Koo et al. |
| 7,295,513 B2 | 11/2007 | Elliott et al. |
| 7,463,631 B2 | 12/2008 | Bao et al. |
| 2002/0137521 A1 | 9/2002 | Jim et al. |
| 2003/0133457 A1 | 7/2003 | Ono et al. |
| 2004/0023661 A1 | 2/2004 | Pi et al. |
| 2004/0062219 A1 | 4/2004 | Holtzman et al. |
| 2004/0228349 A1 | 11/2004 | Vrzic et al. |
| 2005/0002352 A1 | 1/2005 | Bao et al. |
| 2005/0111361 A1 | 5/2005 | Hosein |
| 2005/0129063 A1 | 6/2005 | Razoumov et al. |
| 2005/0195843 A1 | 9/2005 | Ahmed et al. |
| 2005/0201281 A1 | 9/2005 | Damnjanovic et al. |
| 2005/0226199 A1 | 10/2005 | Kimura |
| 2005/0232193 A1 | 10/2005 | Jorgensen |
| 2007/0081498 A1 | 4/2007 | Niwano |

FOREIGN PATENT DOCUMENTS

| | | |
|---|---|---|
| DE | 19907085 | 4/2000 |
| EP | 0917317 | 5/1999 |
| EP | 0977402 | 2/2000 |
| EP | 1003302 | 5/2000 |
| EP | 1089500 | 4/2001 |
| EP | 1130872 | 9/2001 |
| WO | 9842106 | 9/1998 |
| WO | 9845966 | 10/1998 |
| WO | 9859523 | 12/1998 |
| WO | 9912304 | 3/1999 |
| WO | 0025483 | 5/2000 |
| WO | 0041542 | 7/2000 |
| WO | 0163851 | 8/2001 |
| WO | 0171926 | 9/2001 |
| WO | 0225867 | 3/2002 |
| WO | 02085054 | 10/2002 |

OTHER PUBLICATIONS

Paul Bender, et al., "CDMA/HDR: A Bandwidth-Efficient High-Speed Wireless Data Service for Nomadic Users," IEEE Communications Magazine, QUALCOMM, Inc. San Diego, California (USA). Jul. 2000, (pp. 70-77).

International Search Report, PCT/US2002/11641, International Search Authority-European Patent Office, Dec. 4, 2002.

Andrews, et al, "Providing Quality of Service Over a Shared Wireless Link," IEEE Communications Magazine 39(2): 150-154 (Feb. 2001).

Bender, et al., "Flow and Stretch Metrics for Scheduling Continuous Job Streams" In Proc IX Ann. ACM-SIAN Symp. Discrete Algorithms, pp. 270-279, San Francisco, CA (Jan. 1998).

Joshi, et al., "Downlink Scheduling in CDMA Data Networks" ACM Mibicom 2000, pp. 179-190.

Merriam Webster's Collegiate Dictionary, 10th Ed., 1997, p. 927.

Shakkottai, et al., "Scheduling Algorithms for a Mixture of Real-Time and Non-Real-Tiem Data in HDR," Mathematical Science Research Ctr, Bell Labs, Lucent Technologies, Murray Hill, NJ, 17th Intrnl Teletraffic Congress Salvador de Bahia, pp. 1-20, Sep. 2001.

Shakkottai, et al., Scheduling for Multiple Flows Sharing a Time-Varying Channel: The Exponential Rule, Bell Labs, Coordinated Science Laboratory, University of Illinois; Lucent Technologies, Murray Hill, NJ 07974 Dec. 23, 2000.

International Search Report, PCT/US02/011641, International Search Authority, European Patent Office, Dec. 4, 2002.

International Preliminary Examination Report, PCT/US02/011641, International Search Authority, European Patent Office, Dec. 4, 2002.

METHOD AND APPARATUS FOR SCHEDULING PACKET DATA TRANSMISSION IN A WIRELESS COMMUNICATION SYSTEM

CLAIM OF PRIORITY UNDER 35 U.S.C. §120

The present Application for Patent is a Continuation and claims priority to patent application Ser. No. 09/834,774, entitled "METHOD AND APPARATUS FOR SCHEDULING PACKET DATA TRANSMISSIONS IN A WIRELESS COMMUNICATION SYSTEM," filed Apr. 12, 2001, now U.S. Pat. No. 6,657,980 now allowed, and assigned to the assignee hereof.

REFERENCE TO CO-PENDING APPLICATIONS FOR PATENT

This Application for Patent is related to U.S. patent application Ser. No. 09/728,239, entitled "METHOD AND APPARATUS FOR SCHEDULING PACKET DATA TRANSMISSIONS IN A WIRELESS COMMUNICATION SYSTEM," filed on Nov. 30, 2000, assigned to the assignee hereof.

BACKGROUND

1. Field

The present invention relates to wireless data communication. More particularly, the present invention relates to a novel and improved method and apparatus for scheduling packet data transmissions in a wireless communication system.

2. Background

In a wireless communication system, a base station communicates with multiple mobile users. Wireless communications may include low delay data communications, such as voice or video transmissions, or high data rate communications, such as packetized data transmissions. U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003 to Padovani et al., describes high rate packet data transmissions.

Packet data transmissions are not required to be real-time transmissions, and therefore allow the base station flexibility in scheduling mobile user transmissions within a system. Once scheduled, the base station may transmit data to as little as a single mobile user during a given time period. In general, scheduling of packet data mobile users in a system has two goals. For example, channel quality conditions and the amount of pending data for a given user may result in excessive time allocations to that user. There is a need, therefore, for a fair method for scheduling efficient packet data transmissions to mobile users.

SUMMARY

In one aspect, in a wireless communication system adapted for packet data transmissions, a method includes receiving a data rate request (DRR) indicator for a mobile station, determining a fairness parameter $\alpha$ for the mobile station, calculating a projected throughput value T' for the mobile station as a function of the rate request indicator, calculating a priority function for the mobile station, wherein the priority function is a function of $DRR/(T')^{\alpha}$, and scheduling transmissions to the mobile stations according to the priority functions.

According to one aspect, a method for scheduling packet data transactions in a wireless communication system includes determining a pool of users, calculating a priority function of at least a portion of the pool of users, scheduling a first set of users having pending data transactions from the portion of the pool of users, receiving rate request indicators from the portion of the pool of users, and updating priority functions of the first set of users as the rate request indicators divided by a function of projected throughput and a fairness parameter.

In another aspect, a base station apparatus includes a processor, and a memory storage device coupled to the processor, the memory storage device operative to store a plurality of computer readable instructions. The memory storage device includes a first set of instructions to receive a rate request indicator DRR for a mobile station, a second set of instructions to determine a fairness parameter $\alpha$ for the mobile station, a third set of instructions to calculate a projected throughput value T' for the mobile station as a function of the rate request indicator, a fourth set of instructions to calculate a priority function for the mobile station, wherein the priority function is a function of $DRR/(T')^{\alpha}$, and a fifth set of instructions to schedule transmissions to the mobile stations according to the priority functions.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

In an exemplary embodiment of the present invention, a base station of a spread-spectrum wireless communication system schedules packet data transmissions to mobile users based upon the instantaneous values of a per-user Priority Function (PF). The user scheduling priority is related to the PF value, wherein a high PF value indicates a high scheduling priority and a low PF value indicates a low priority. In one aspect, a method for determining PF values is based on a channel condition indicated by a Rate Request Indicator (RRI). The method also considers a fairness criterion dictated by the Quality Of Service (QOS) requirements. Such a method provides robust protection against non-zero buffer under-runs on the transmitter side. In one embodiment, the rate request indicator is a Data Rate Request (DRR). In another embodiment, the rate request indicator is Carrier-to-Interference (C/I) information. Alternate embodiments may implement other types of rate request indicators or predictors. In the exemplary embodiment, the base station calculates a Priority Function (PF) for the multiple mobile users. Each PF is a function of the rate request indicator and the projected throughput of a given mobile user. The PF values allow the base station to schedule active mobile units having pending data. The scheduling produces an approximately equal share of the allocated transmission time to the multiple mobile stations.

Scheduling allocation improves channel sensitivity by reducing adverse effects associated with assigned data rates.

Actual data rate assignments provide quantized transmission rates. This results in a coarse adjustment of data rates within a system. Actual data rates may be truncated, or otherwise manipulated, to conform to the assigned and available data rates. By using a rate request indicator to determine a transmission data rate, the data rate is adjusted according to the actual requirements and operating environment of the system.

Figure 1:
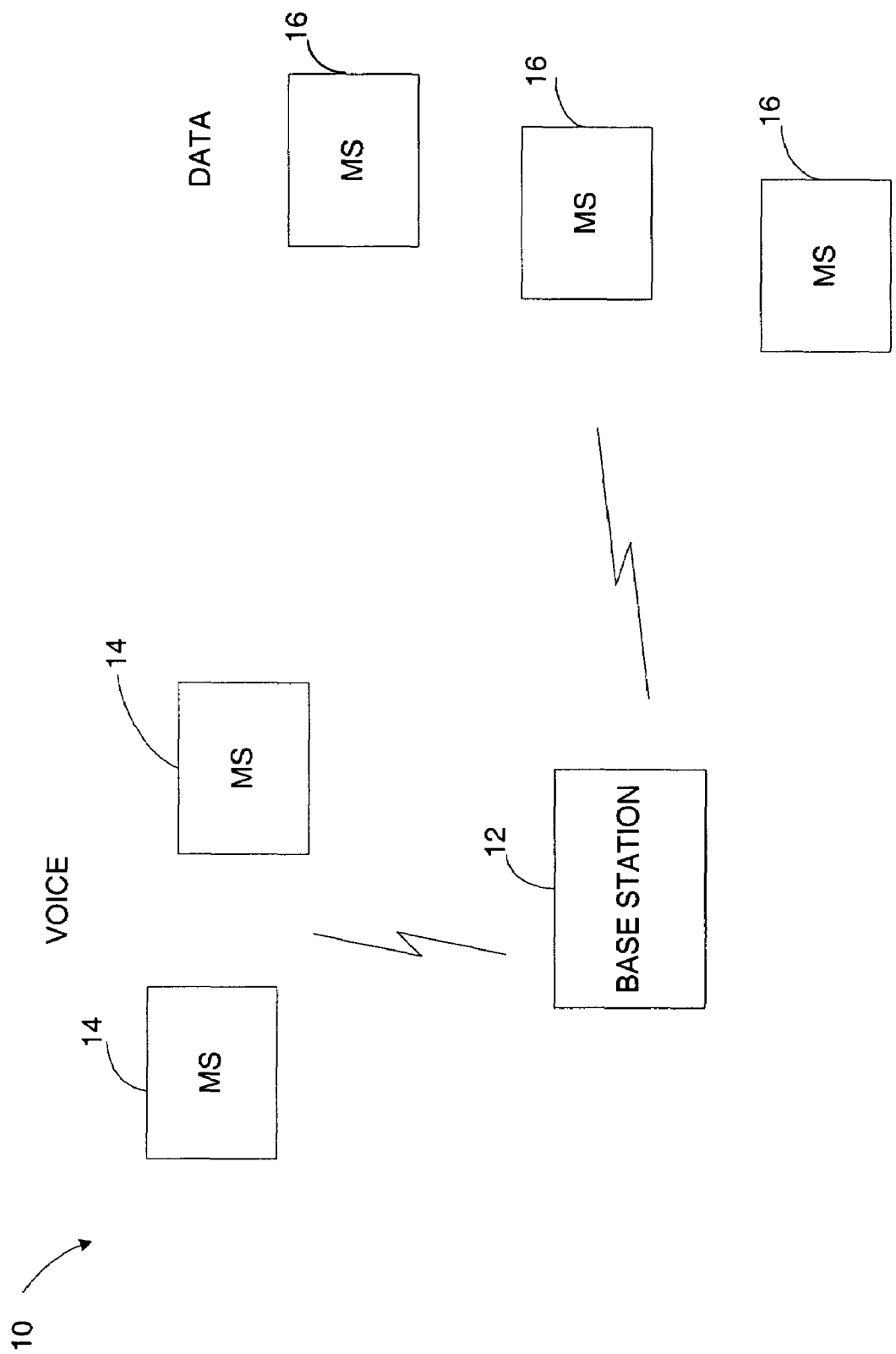
FIG. 1 illustrates in block diagram form a wireless communication system.

In an exemplary embodiment illustrated in FIG. 1, a wireless communication system 10 includes a base station 12 that communicates with mobile stations 14 and mobile stations 16 via an air interface or radio link. The base station 12 processes separate transmissions for each of mobile stations 16. As illustrated, mobiles stations 14 are employing low delay data communication type services, such as voice communications, while mobile stations 16 are employing high rate packet data communications. Communications between base station 12 and mobile stations 14 are performed in real-time and therefore all active communications are performed simultaneously and concurrently. In contrast, packet data communications with mobile stations 16 may be scheduled, wherein communications to multiple mobile stations 16 are transmitted simultaneously at a given time. Alternate embodiments may allow concurrent transmissions to more than one of mobile stations 16 seeking to optimize channel utilization.

Figure 2:
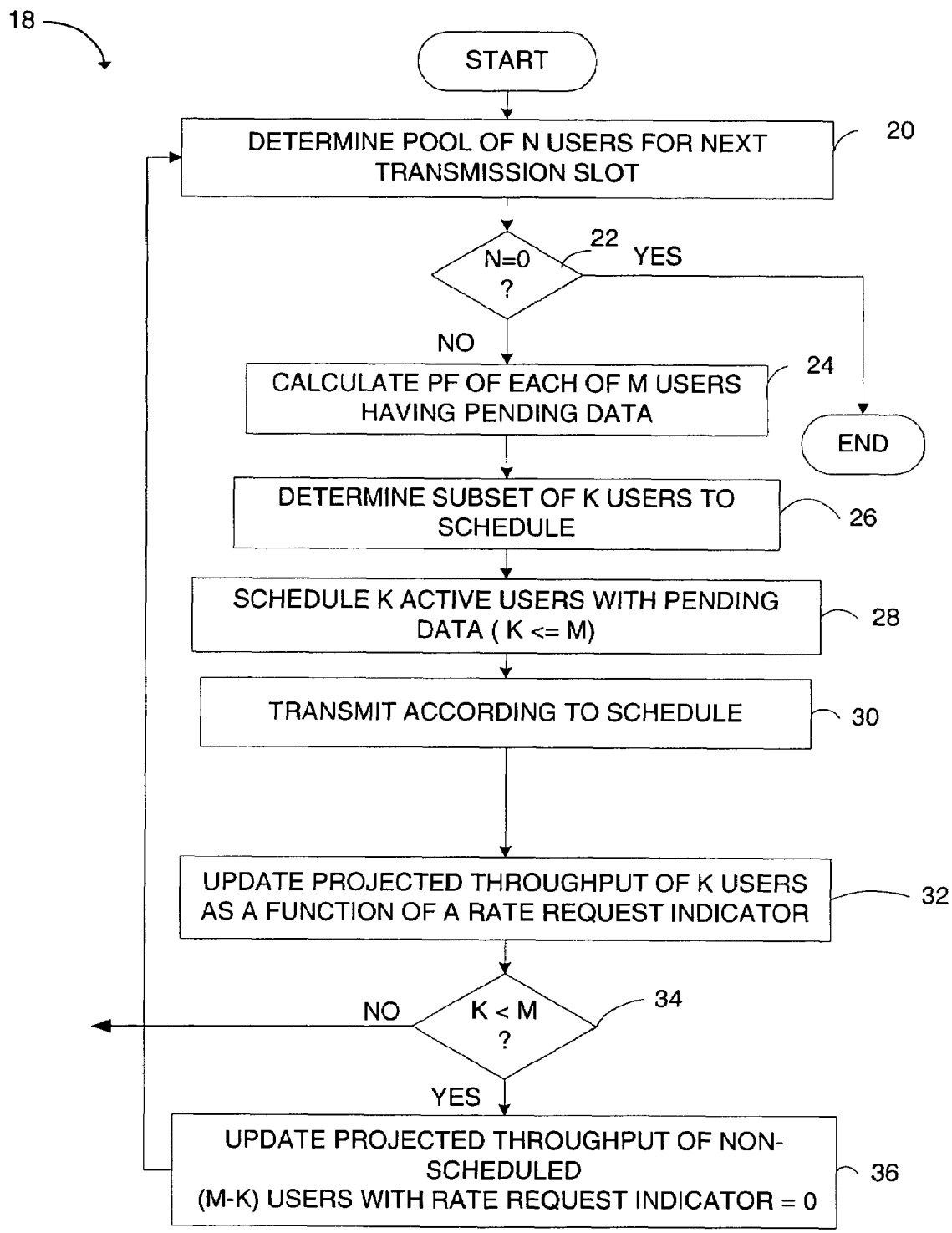
FIG. 2 illustrates in flow diagram form a method for scheduling packet data transmission.

FIG. 2 illustrates a method 18 for scheduling mobile stations 16 within system 10. The process begins by determining a pool of active mobile users within system 10 at step 20. The total number of mobile stations 16, or users, in the pool is designated as "N." If N is equal to 0, at step 22, the process ends. Otherwise, the process continues to step 24 to calculate a PF for each of a subset of "M" users within the pool, wherein the M active users have data pending. The PF calculation is performed according to the following equation:

$$PF(j) = \frac{DRR(j)}{T'(j)}, \text{ for } j = 1, \ldots, M, \quad (1)$$

wherein j is a user index corresponding to the M active users with pending data. In the exemplary embodiment, a rate request indicator is implemented as DRR(j), the Data Rate Request (DRR) received from user j, for j=1, ..., M. Having the channel-sensitive rate request indicator in the numerator provides proportionality to the scheduling of users in system 10. The rate request indicator is then divided by a projected throughput associated with each user j, T'(j) if the user was scheduled and the user's buffer contained enough data to transmit at the expected rate. The actual throughput of each user, j, may be represented as T(j), although the actual throughput is not used directly in this calculation of Equation (1).

From the subset of M active users with data pending, at step 26, a further subset is determined of "K" users to be scheduled for transmission. In the exemplary embodiment, the subset of K users is determined according to system configuration and a predetermined scheduling policy. Often K=1, or K is constrained to a single user. However, K may be any number less than or equal to M. Based on the calculated PF values, the base station schedules "K" users at step 28. Note that the K scheduled users constitute a subset of the N active users, i.e., (K≦M≦N). The base station 12 then transmits packet data transmissions at step 30 according to the schedule of step 28. Transmission involves determination of transmission power, power control, data rate, modulation, and other parameters of transmission. Note that concurrently, the base station 12 may be transmitting low latency transmissions to mobile stations 14.

At step 32, the base station 12 updates each projected throughput, T', for each of the K scheduled users as a function of a corresponding rate request indicator received from each scheduled user. The following formula describes the T' update calculation for scheduled users according to the exemplary embodiment:

$$T'(j, n+1) = (1-\beta) \cdot T'(j, n) + \beta \cdot DRR(j) \quad (2)$$

using a low pass filter with a filter parameter β for digital samples having index n. In one embodiment, the time constant may be related to the targeted QOS and/or velocity of each mobile station 16. In the exemplary embodiment, a rate request indicator is implemented as DRR(l), the Data Rate Request (DRR) received from user l, for l=1, ..., N. Having the channel-sensitive rate request indicator in the numerator provides proportionality to the scheduling of users in system 10. The rate request indicator is then divided by a projected throughput associated with each user j, T'(j). The actual throughput of each user, j, may be represented as T(j), although the actual throughput is not used directly in this calculation of Equation (1). Rather, the scheduling method makes a prediction or projection of the throughput of each user based on the rate request indicator received from that user. The rate request indicator may be the DRR transmitted via a Data Rate Control (DRC) channel, wherein the user determines a quality of the transmission channel and determines a corresponding data rate to request. The quality of the transmission channel may be a C/I measure of transmissions received by the user, wherein a corresponding DRR is associated with the C/I ratio, such as via a lookup table. In one embodiment, the user sends the C/I ratio to the base station 12 and the base station 12 determines a data rate based on the C/I. Alternately, the user may determine the data rate to request based on measuring C/I and on errors in transmitted data received by the user. The user may use a variety of methods to determine a data rate to request of the base station. Similarly, the user may implement a variety of rate request indicators for requesting a data rate from the base station. Still further, in one embodiment, different mobile stations 16 implement different rate request indicators.

If K<M at step 34 processing continues to step 36 to update each T' for non-scheduled users within the pool of N active users, i.e., users not included in the M scheduled users. The projected throughput calculation for non-scheduled users is given as:

$$T'(i, n+1) = (1-\beta) \cdot T'(i, n), \quad (3)$$

for i=1, ..., (M−K). Here the rate request indicator is assumed to be zero for calculation of the projected throughput used for updating each PF associated with non-scheduled users.

The updated projected throughput values are used to update PF values. Processing then returns to step 26 wherein the updated PF values are used to continue scheduling any users that still have pending data.

The exemplary embodiment updates the PF values for each user as if each mobile station 16 always has a sufficient amount of pending data, and that the rate requested by each mobile station 16 is realizable. Therefore, the scheduling sequence generated by the PF computed as in Equations (1)-(3) is not sensitive to any unpredictable states of the transmission buffers as long as a buffer has at least one bit of data to send.

Figure 3:
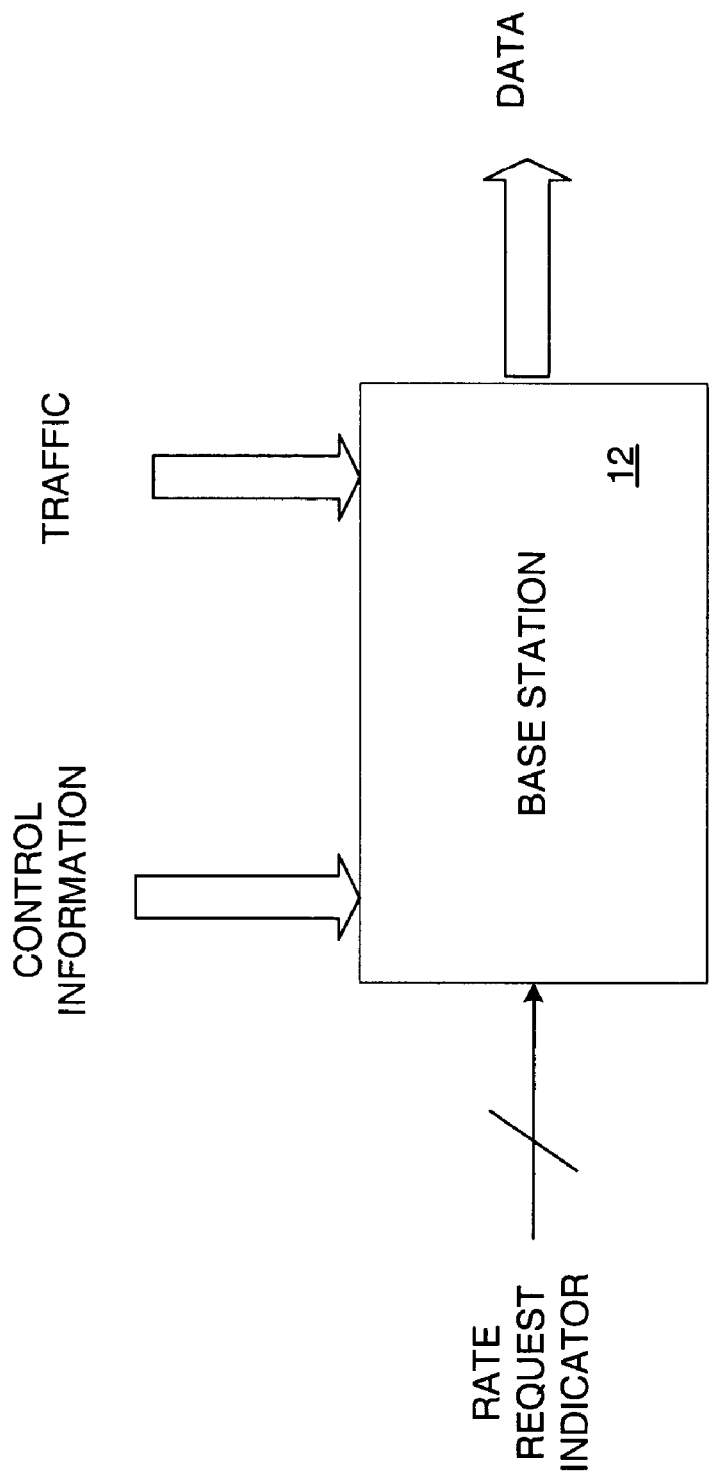
FIG. 3 illustrates in block diagram form a base station.

FIG. 3 further details base station 12, including signals received, processed, and transmitted. As illustrated, base station 12 receives a rate request indicator, such as DRR or C/I, from multiple mobile stations 16. Control information is received from at least the mobile stations 16, and also may be received from a central controller, such as a Base Station Controller (BSC) (not shown). The base station receives traffic, referred to as "backbone traffic," from a network (not shown), such as the Internet. In response to these signals, base station 12 transmits data to mobile stations 16.

Figure 4:
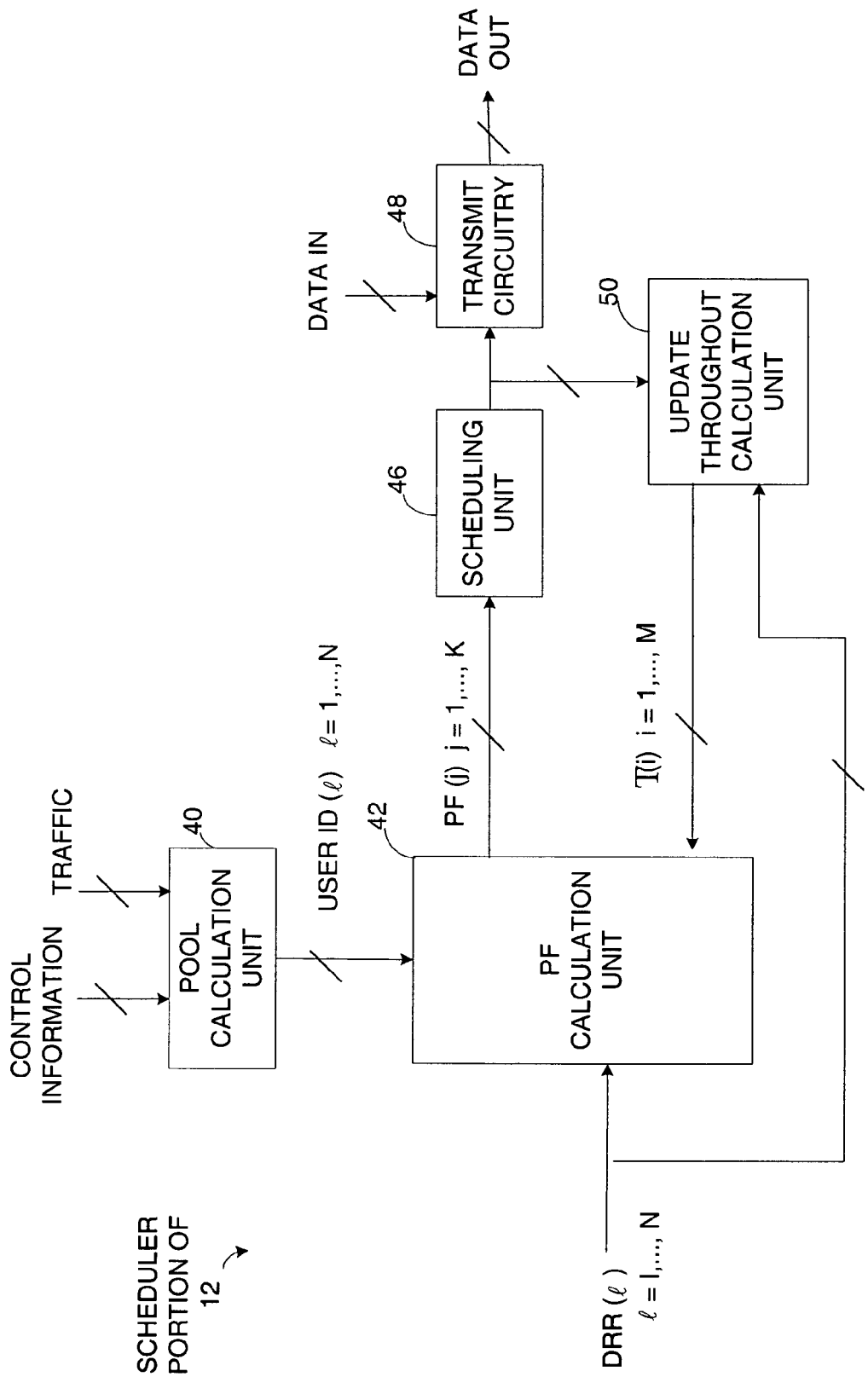
FIG. 4 illustrates in block diagram form a portion of a base station.

FIG. 4 further details a scheduler portion of base station 12. Base station 12 includes a pool calculation unit 40 for determining the number and identification of mobile stations 16 active at a given time. Active mobile stations 16 communicate with base station 12, but may not have any pending data transactions. The pool calculation unit 40 receives control information from the mobile stations 16 and the BSC (not shown), and also receives traffic from a network (not shown). In response, the pool calculation unit 40 provides user identification information, User ID(l) for l=1, . . . , N, to a PF calculation unit 42. The user identification information is provided for all N active users in system 10.

The PF calculation unit 42 receives data rate request indicators from the mobile stations 16, such as DRR(l). The PF calculation unit 42 uses the rate request indicator to determine a PF for each user according to Equation (1). The PF(j) for all users having pending data j=1, . . . , K are provided to a scheduling unit 46. The scheduling unit 46 determines a schedule among the various users associated with PF(j). The scheduling unit 46 provides the schedule information to transmit circuitry 48. DATA IN is also provided to transmit circuitry 48, which transmits the data according to the schedule information to produce DATA OUT. The schedule information is also provided to a calculation unit 50 which updates the projected throughput of the active N users. The scheduled users are updated according to Equation (2), while the non-scheduled users are updated according to Equation (3). For updating the projected throughput values, the calculation unit 50 receives rate request indicators for mobile stations 16. The updated projected throughput values for the subset of M users with pending data are then provided back to the PF calculation unit 42 to update the PF values. The calculation unit 50 includes a smoothing filter, such as an Infinite Impulse Response (IIR) filter. The tap coefficients for the smoothing filter are configurable.

In one example, a mobile station 16 has a velocity of 3 km/hr and experiences a doppler frequency, $f_{doppler}$, of 5.4 Hz. Projected throughput(s) are subject to IIR smoothing filtering according to Equations (2) and (3) with a time constant, $T_W$, given approximately as 2 sec. The IIR filter tap coefficient, $\beta$, is related to time constant $T_W$ by a relation given as:

$$\alpha = \frac{1}{T_W \cdot \left(\frac{\text{frames}}{\text{sec.}}\right)}, \quad (4)$$

resulting in a time constant of 1/100 given a frame duration of 20 msec., i.e., 50 frames/sec. In general calculation of $\beta$ involves first determining a quality of service for the transmissions reflecting a fairness constraint wherein each mobile station 16 is allocated a time fraction within a predetermined tolerance. The calculation then optimizes $\alpha$ to achieve optimum real system throughput.

In one embodiment, the denominator of the priority function is modified to a function given as f(T'), wherein the function is a monotonic function of T', such as $(T')^\alpha$. In this embodiment, $\alpha$ is the fairness parameter. The introduction of an exponential function of the throughput changes the fairness versus total throughput tradeoff. In application to a proportional fair algorithm, $$PF(i) = \frac{DRR(i)}{T'(i)},$$

or $$PF(i) = \frac{DRR(i)}{(T'(i))^\alpha}.$$

As with other scheduling algorithms, a trade-off exists between fairness and throughput. Increases in $\alpha$ correspondingly increase the fairness of the scheduling, while reducing the total throughput.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor, DSP, an Application Specific Integrated Circuit, ASIC, a Field Programmable Gate Array, FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory, RAM, flash memory, Read Only Memory, ROM, Electrically Programmable ROM, EPROM, Electrically Erasable Programmable ROM, EEPROM, registers, hard disk, a removable disk, a Compact-Disk ROM, CD-ROM, or any other form of non-transitory storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for a wireless communication system supporting packet data transmissions, comprising:
   means for receiving a rate request indicator DRR for a mobile station;
   means for determining a fairness parameter $\alpha$ for the mobile station;
   means for calculating a projected throughput value T' for the mobile station as a function of the rate request indicator;
   means for calculating a priority function for the mobile station as $DRR/(T')^\alpha$; and
   means for scheduling transmissions to the mobile stations according to the priority functions.

2. The apparatus as in claim 1, wherein the means for calculating the priority function farther comprises means for calculating the priority function using a monotonic function of $(T')^{60}$.

3. The apparatus of claim 1, wherein each of the rate request indicators is a data rate request received from one of the plurality of mobile stations.

4. The apparatus of claim 1, wherein each of the rate request indicators is a carrier-to-interference ratio received from one of the plurality of mobile stations.

5. The apparatus of claim 1, further comprising:
   means for transmitting data to the plurality of mobile stations in response to scheduling transmissions.

6. The apparatus of claim 1, further comprising:
   means for updating the priority functions of scheduled mobile stations as a function of the rate request indicator.

7. The apparatus of claim 6, further comprising:
   means for updating the priority functions of non-scheduled mobile stations assuming the rate request indicator is equal to zero.

8. An apparatus for scheduling packet data transactions in a wireless communication system, comprising:
   means for determining a pool of users;
   means for calculating a priority function of at least a portion of the pool of users;
   means for scheduling a first set of users having pending data transactions from the portion of the pool of users;
   means for receiving rate request indicators from the portion of the pool of users; and
   means for updating priority functions of the first set of users as the rate request indicators divided by a function of projected throughput and a fairness parameter.

9. The apparatus of claim 8, further comprising:
   means for updating a second set of users within the portion of the pool of users different from the first set of users using a rate request of zero.

10. The apparatus as in claim 8, wherein the portion of the pool of users are users having pending data.

11. The apparatus as in claim 10, wherein the first set of users comprises one user.

12. A non-transitory medium encoded with executable instructions for:
    receiving a rate request indicator DRR for a mobile station;
    determining a fairness parameter $\alpha$ for the mobile station;
    calculating a projected throughput value T' for the mobile station as a function of the rate request indicator;
    calculating a priority function for the mobile station as $DRR/(T')^\alpha$; and
    scheduling transmissions to the mobile stations according to the priority functions.

13. A non-transitory medium encoded with executable instructions for:
    determining a pool of users;
    calculating a priority function of at least a portion of the pool of users;
    scheduling a first set of users having pending data transactions from the portion of the pool of users;
    receiving rate request indicators from the portion of the pool of users; and
    updating priority functions of the first set of users as the rate request indicators divided by a function of projected throughput and a fairness parameter.

14. An apparatus comprising:
    a memory storage device; and
    a processor coupled to said memory storage device, the processor being configured to:
      receive a rate request indicator DRR for a mobile station;
      determine a fairness parameter a for the mobile station;
      calculate a projected throughput value T' for the mobile station as a function of the rate request indicator;
      calculate a priority function for the mobile station as $DRR/(T')^\alpha$; and
      schedule transmissions to the mobile stations according to the priority functions.

15. The apparatus as in claim 14, wherein the processor is further configured to calculate the priority function using a monotonic function of $(T')^\alpha$.

16. The apparatus of claim 14, wherein each of the rate request indicators is a data rate request received from one of the plurality of mobile stations.

17. The apparatus of claim 14, wherein each of the rate request indicators is a carrier-to-interference ratio received from one of the plurality of mobile stations.

18. The apparatus of claim 14, further comprising a transmitter configured to transmit data to the plurality of mobile stations in response to the scheduled transmissions.

19. The apparatus of claim 14, wherein the processor is further configured to update the priority functions of scheduled mobile stations as a function of the rate request indicator.

20. The apparatus of claim 19, wherein the processor is further configured to update the priority functions of non-scheduled mobile stations assuming the rate request indicator is equal to zero.

21. A base station apparatus comprising:
    a base station transmitter;
    a memory storage device; and a processor coupled to said transmitter and memory storage device, the processor being configured to:
receive a rate request indicator DRR for a mobile station;
determine a fairness parameter a for the mobile station;
calculate a projected throughput value T' for the mobile station as a function of the rate request indicator;
calculate a priority function for the mobile station as $DRR/(T')^{\alpha}$; and
schedule transmissions to the mobile stations according to the priority functions.

* * * * *